United States Patent
Tsai et al.

(10) Patent No.: US 9,836,082 B2
(45) Date of Patent: Dec. 5, 2017

(54) WEARABLE ELECTRONIC APPARATUS

(71) Applicant: HTC Corporation, Taoyuan (TW)

(72) Inventors: Ming-Han Tsai, Taoyuan (TW);
Chun-Hao Huang, Taoyuan (TW);
Chia-Wei Chen, Taoyuan (TW);
Hsin-Ti Chueh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 30 days.

(21) Appl. No.: 14/631,860

(22) Filed: Feb. 26, 2015

(65) Prior Publication Data

US 2016/0252985 A1  Sep. 1, 2016

(51) Int. Cl.
*G06F 3/041* (2006.01)
*G06F 1/16* (2006.01)
*G06F 3/0488* (2013.01)
*G06F 3/0354* (2013.01)

(52) U.S. Cl.
CPC ............ *G06F 1/163* (2013.01); *G06F 1/1652* (2013.01); *G06F 3/03547* (2013.01); *G06F 3/04883* (2013.01); *G06F 3/04886* (2013.01); *G06F 2203/04102* (2013.01)

(58) Field of Classification Search
CPC ............... G06F 3/0416; G06F 3/04883; G06F 3/04886; G06F 2203/04808; G04G 21/08
See application file for complete search history.

(56) References Cited

U.S. PATENT DOCUMENTS

| | | | |
|---|---|---|---|
| 8,059,101 B2 | 11/2011 | Westerman et al. | |
| 2006/0092177 A1* | 5/2006 | Blasko | G04G 21/08 345/619 |
| 2008/0316183 A1* | 12/2008 | Westerman | G06F 3/0416 345/173 |
| 2009/0199130 A1* | 8/2009 | Tsern | G04G 21/08 715/810 |
| 2014/0068494 A1* | 3/2014 | Petersen | H04M 1/7253 715/778 |
| 2016/0110093 A1* | 4/2016 | S | G06F 3/04883 715/863 |

* cited by examiner

*Primary Examiner* — Towfiq Elahi
(74) *Attorney, Agent, or Firm* — CKC & Partners Co., Ltd.

(57) ABSTRACT

A wearable electronic apparatus includes a touch panel and a processor. The touch panel is configured for providing a touch interface and detecting a swipe gesture across the touch interface. The touch interface has a first portion and a second portion. The processor is operatively coupled to the touch panel. The processor is adapted to assign a first border layout and a second border layout for discriminating between a vertical swipe and a horizontal swipe. The first border layout is different from the second border layout. The processor is further adapted to recognize whether an initial touchdown point of the swipe gesture is located in the first portion or the second portion of the touch interface.

13 Claims, 7 Drawing Sheets

WEARABLE ELECTRONIC APPARATUS

BACKGROUND

Field of Invention

The present application relates to a touch sensing technique on an electronic apparatus. More particularly, the present application relates to a touch sensing technique for discriminating different swipe gesture on a wearable electronic apparatus.

Description of Related Art

Recently, touch panels are widely used as input interfaces on all kinds of electronic devices, such as computers, smart phones, digital cameras, etc. In order to elevate the portability of the electronic devices, some wearable electronic devices (e.g., smart watches, smart wristbands, etc) are developed such that users can carry and manipulate these wearable electronic devices easily.

In general, the wearable electronic devices are equipped with relative smaller touch panels. When users perform some touch gestures on these small-sized touch panels, the touch gestures detected by the small-sized touch panels include fewer sample points and shorter displacements in comparison to regular-sized touch panels. It is hard to recognize the touch gestures with high preciseness on the small-sized touch panels by conventional sensing methods.

SUMMARY

When a user carries a wearable electronic apparatus on his wrist, the user can perform a swipe gesture to trigger some specific functions (e.g., switching pages of a user interface). Wearable electronic apparatus may have different sizes of touch panels. Based on difference of touch panel sizes, it should have different algorithm to perform the directional recognition of a swipe gesture. This disclosure provides a wearable electronic apparatus, which is capable of recognizing whether the swipe gesture is the vertical swipe or the horizontal swipe in reference to different border layouts. The different border layouts are selected in response to an initial touchdown point of the swipe gesture. Therefore, the swipe gestures with different initial touchdown points will be recognized under different border layouts.

An aspect of the present disclosure is to provide a wearable electronic apparatus, which includes a touch panel and a processor. The touch panel is configured for providing a touch interface and detecting a swipe gesture across the touch interface. The touch interface has a first portion and a second portion. The processor is operatively coupled to the touch panel. The processor is adapted to assign a first border layout and a second border layout for discriminating between a vertical swipe and a horizontal swipe. The first border layout is different from the second border layout. The processor is further adapted to determine whether an initial touchdown point of the swipe gesture is located in the first portion or the second portion of the touch interface.

In response to the initial touchdown point is located in the first portion, the processor is further adapted to recognize whether the swipe gesture is the vertical swipe or the horizontal swipe according to a directional vector of the swipe gesture in reference to the first border layout.

In response to the initial touchdown point is located in the second portion, the processor is further adapted to recognize whether the swipe gesture is the vertical swipe or the horizontal swipe according to the directional vector of the swipe gesture in reference to the second border layout.

Another aspect of the present disclosure is to provide a non-transitory computer readable storage medium storing one or more programs. The one or more programs includes instructions, which when executed by a wearable electronic device with a touch interface, causes the wearable electronic device to perform a method. The method includes steps of: assigning a first border layout and a second border layout for discriminating between a vertical swipe and a horizontal swipe; detecting a swipe gesture across the touch interface; determining whether an initial touchdown point of the swipe gesture is located in the first portion or the second portion of the touch interface; in response to the initial touchdown point is located in the first portion, recognizing whether the swipe gesture is the vertical swipe or the horizontal swipe according to a directional vector of the swipe gesture in reference to the first border layout; and, in response to the initial touchdown point is located in the second portion, recognizing whether the swipe gesture is the vertical swipe or the horizontal swipe according to the directional vector of the swipe gesture in reference to the second border layout.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
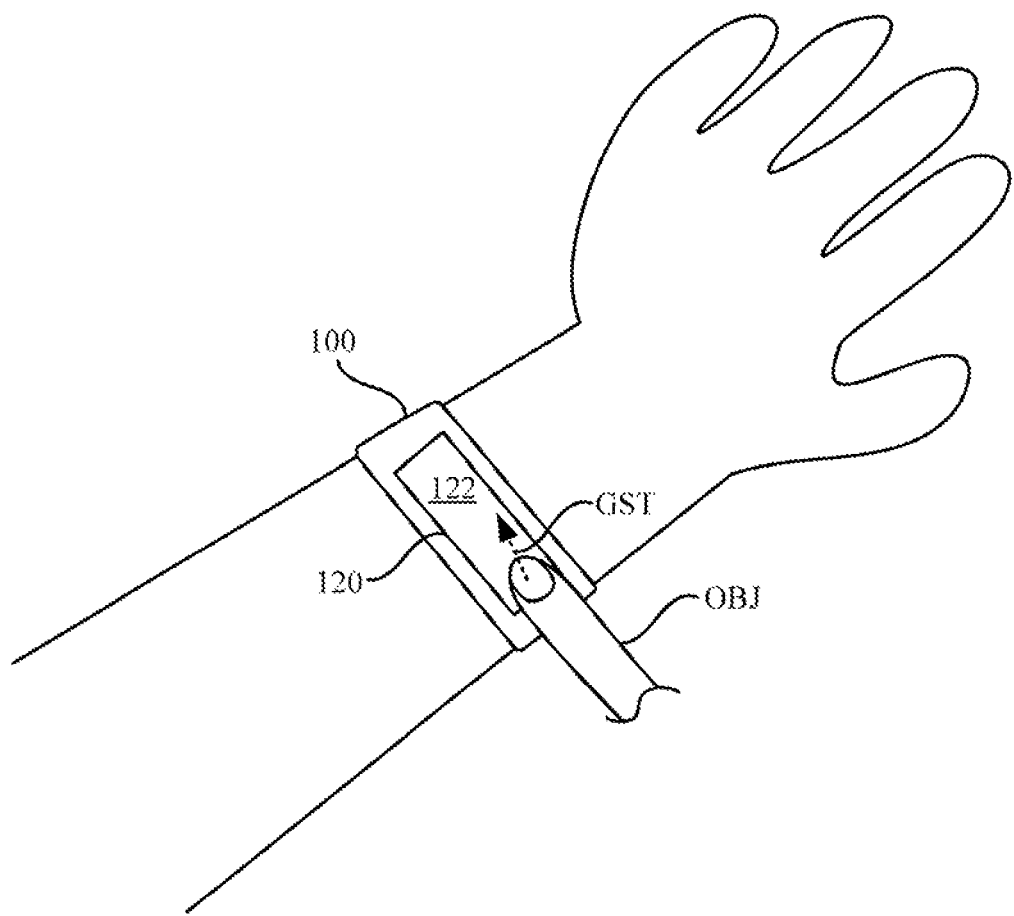
FIG. 1 is a schematic diagram illustrating a wearable electronic apparatus according to an embodiment of the disclosure.

Reference is made to FIG. 1, which is a schematic diagram illustrating a wearable electronic apparatus 100 according to an embodiment of the disclosure. In some embodiments, the wearable electronic apparatus 100 can be a smart watch, a smart wristband, a smart bracelet or any equivalent portable electronic device. As shown in FIG. 1, the wearable electronic apparatus 100 includes a touch panel 120, which can be a display screen integrated with a touch input sensing module (e.g., a resistive touch sensor, a capacitive touch sensor, an optical touch sensor, a surface acoustic wave touch sensor, etc). The touch panel 120 is configured for providing a touch interface 122 and detecting some touch input gestures performed by an object (e.g., a finger of user as shown in FIG. 1) across the touch interface 122.

There are many types of touch input gestures, such as tapping, sliding, holding, dragging, and many more. One of common touch input gestures is a swipe gesture. As shown in FIG. 1, the object performs the swipe gesture GST on the touch interface 122. The swipe gesture GST includes that the object OBJ contacts on the touch interface 122 at an initial touchdown point, keep contacting on the touch interface 122, and moves toward a target direction (upward, downward, rightward, leftward, etc).

The touch panel 120 is configured for detecting the swipe gesture GST, and then a processor (not shown in figures) of the wearable electronic apparatus is configured to execute a corresponding function (e.g., switching pages of the user interface, scrolling the screen, forwarding a message or any equivalent functions) triggered by the swipe gesture GST. The processor is operatively coupled to the touch panel 120. The processor can be a control integrated circuit, a central processing unit, a touch controller, a system on-chip circuit of the wearable electronic apparatus 100.

The swipe gesture GST is detected by the touch panel 120 and then recognized as a horizontal swipe (including a rightward swipe and a leftward swipe) or a vertical swipe (including an upward swipe and a downward swipe) for properly triggering the corresponding function.

On a regular-sized touch screen of a common electronic device (e.g., a notebook computer, a tablet computer or a smartphone), there is more space of users to perform the touch input gesture properly, and users tend to hold the electronic device in a clear vertical/horizontal direction. Therefore, it is easy to distinguish between a horizontal swipe and a vertical swipe.

In some embodiment, due to the limitations of size and weight of the wearable electronic apparatus 100, a diagonal length of the touch panel 120 is less than or equal to three inches, such that the portability or mobility of the wearable electronic apparatus 100 can be enhanced. As shown in FIG. 1, the touch panel 120 is a small-sized touch panel in a rectangular shape in this embodiment. Because the size of the touch interface 122 on the wearable electronic apparatus 100 is relatively small (compared to a tablet computer or a smartphone) and also the user may change the angle of his arm occasionally, such that the swipe gesture GST might not have a perfectly clear direction toward right, left, top or down side. The swipe gesture GST detected on the touch panel 120 of the wearable electronic apparatus 100 may be a diagonal swipe (e.g., top-rightward, top-leftward, bottom-rightward or bottom-leftward), which includes a combination of a vertical displacement and a horizontal displacement with different magnitudes.

In some embodiments, the processor of the wearable electronic apparatus 100 is able to perform a gesture detection method, which is configured to recognize the swipe gesture GST into the vertical/horizontal swipe properly, so as to acknowledge a correct intention of the user and trigger the corresponding function correctly.

Figure 2:
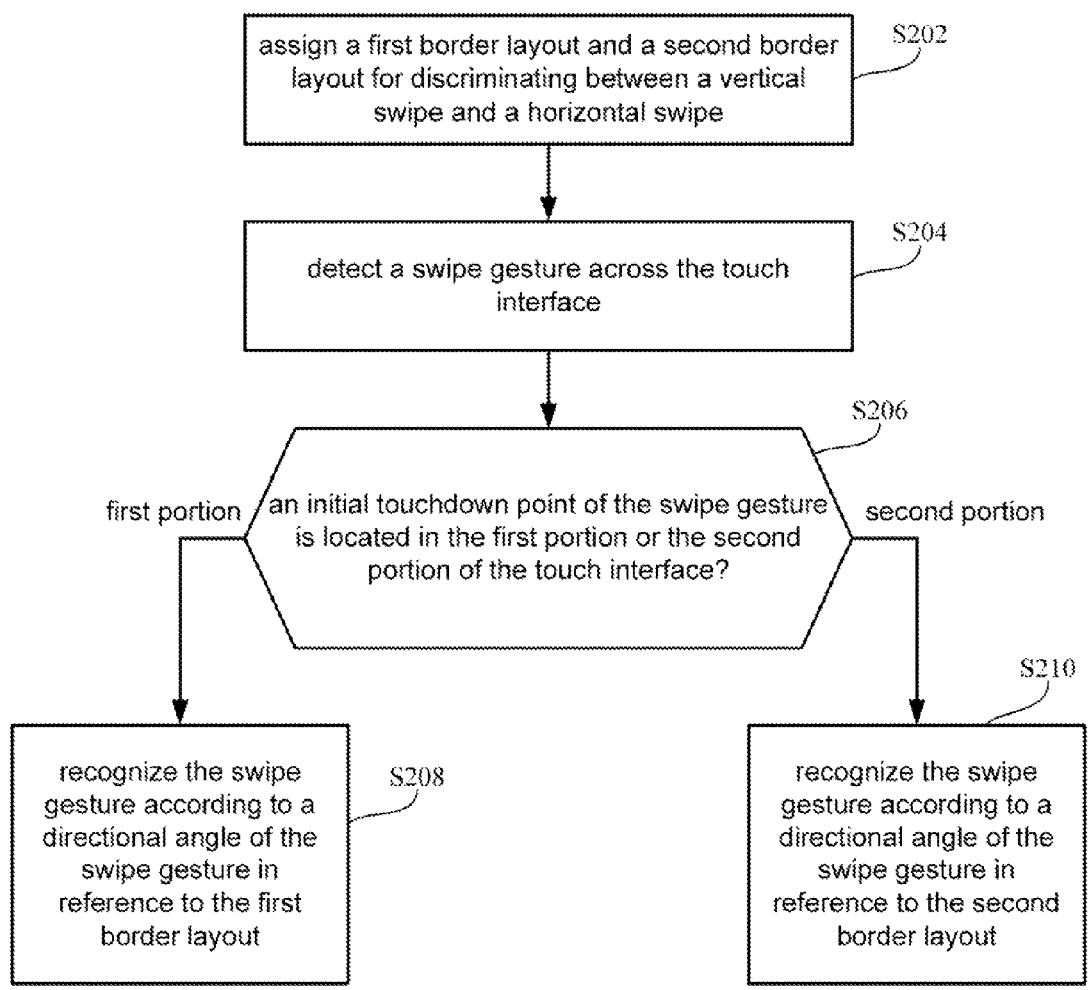
FIG. 2 is a flow chart diagram illustrating the gesture detection method according to an embodiment of this disclosure.
Figure 3A:
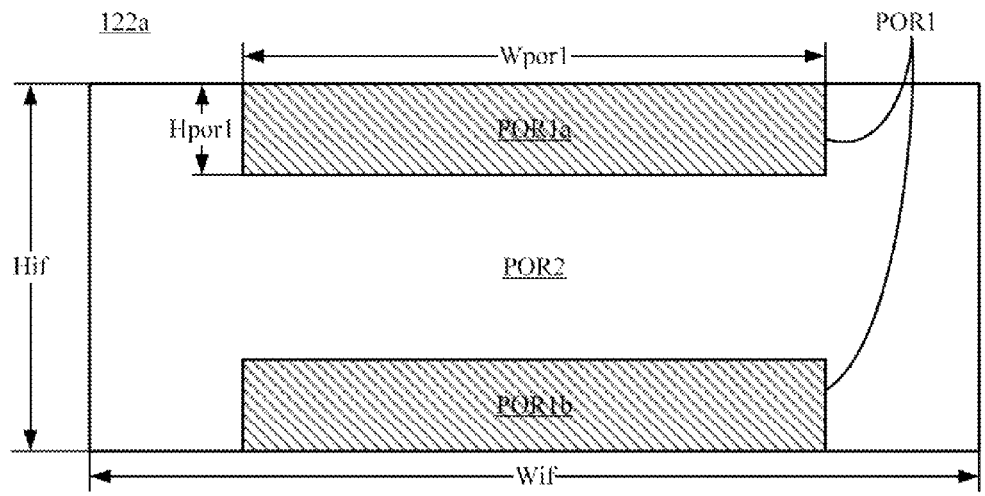
FIG. 3A is a schematic diagram illustrating a touch interface provided by the touch panel according to an embodiment of this disclosure.
Figure 3B:
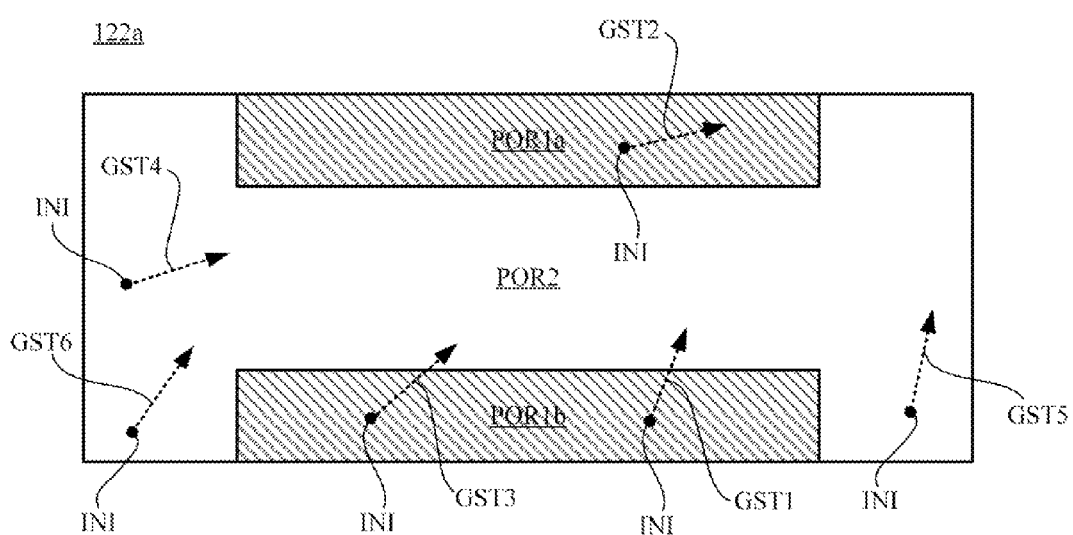
FIG. 3B is a schematic diagram illustrating different swipe gestures on the touch panel according to the embodiment shown in FIG. 3A.

Reference is also made to FIG. 2, FIG. 3A and FIG. 3B. FIG. 2 is a flow chart diagram illustrating the gesture detection method 200 according to an embodiment of this disclosure. FIG. 3A is a schematic diagram illustrating a touch interface 122a provided by the touch panel according to an embodiment of this disclosure. FIG. 3B is a schematic diagram illustrating different swipe gestures GST1~GST6 on the touch panel according to the embodiment shown in FIG. 3A.

As shown in FIG. 3B each of the different swipe gestures GST1~GST6 has an initial touchdown point INI respectively. The gesture detection method 200 is configured to discriminate the swipe gestures GST1~GST6 with different standards according to different locations of their initial touchdown points INI.

As shown in FIG. 2, the gesture detection method 200 executes step S202 to assign a first border layout and a second border layout, which are utilized for discriminating between a vertical swipe and a horizontal swipe. The first border layout is different from the second border layout. The details of the first border layout and the second border layout will be explained in the following paragraphs.

Afterward, the gesture detection method 200 executes step S204 to detect a swipe gesture GST across the touch interface 122 (referring to FIG. 1A). As shown in FIG. 3B, there are six examples of swipe gestures GST1~GST6. The swipe gestures GST1~GST6 have their initial touchdown points INI located at different location on the touch interface 122a.

In this embodiment, the touch interface 122a is shaped as a rectangle having a first pair of edges (i.e., the top edge and the bottom edge shown in FIG. 3A and FIG. 3B) and a second pair of edges (i.e., the right edge and the left edge shown in FIG. 3A and FIG. 3B). The first pair of edges is longer than the second pair of edges.

In the embodiment shown in FIG. 3B, the first portion POR1 includes two elongated strip areas POR1a and POR1b located beside a middle part of the first pair of edges. In this case, the elongated strip area POR1a is located at the top-middle beside the top edge of the touch interface 122a, and the elongated strip area POR1b is located on the opposite side at the bottom-middle beside the bottom edge of the touch interface 122a. A width of the elongated strip area POR1a (and also the elongated strip area POR1b) is 60% (±10%) of an overall width Wif of the touch interface 122a. In an embodiment, a height of the elongated strip area POR1a (and also the elongated strip area POR1b) is 25% (±5%) of an overall height Hif of the touch interface 122a.

Due to the size of the touch panel 120 is small, when the user tends to conduct a downward swipe, the elongated strip area POR1a is a hot area where the user begins the downward swipe. Similarly, when the user tends to conduct an upward swipe, the elongated strip area POR1b is a hot area where the user begins the upward swipe. In other words, when the user tends to conduct a vertical swipe, the user has a higher possibility to begin the vertical swipe in the first portion POR1 (including the elongated strip areas POR1a and POR1b).

As shown in FIG. 3A and FIG. 3B, the second portion POR2 of the touch interface 122a includes an "H"-shaped area located beside the second pair of edges (i.e., the right edge and the left edge of the touch interface 122a) and at a center part of the touch interface 122a. When the user tends to conduct a rightward swipe, the area around the left edge (and also the center area) of the touch interface 122a is a hot area where the user begins the rightward swipe. When the user tends to conduct a leftward swipe, the area around the right edge (and also the center area) of the touch interface 122a is a hot area where the user begins the leftward swipe. Therefore, the second portion POR2 is a hot area where the user begins the horizontal swipe.

The gesture detection method 200 executes step S206 to determine whether an initial touchdown point INI of the swipe gesture GST1~GST6 is located in the first portion POR1 or the second portion POR2 of the touch interface 122a. As shown in FIG. 3B, the swipe gestures GST1, GST2 and GST3 have their initial touchdown points INI in the first portion POR1; on the other hand, the swipe gestures GST4, GST5 and GST6 have their initial touchdown points INI in the second portion POR2.

In response to the initial touchdown point INI is located in the first portion POR1 (i.e., the swipe gesture GST1, GST2 or GST3), the gesture detection method 200 executes step S208 to recognize whether the swipe gesture is the vertical swipe or the horizontal swipe according to a directional vector of the swipe gesture in reference to the first border layout.

Figure 4A:
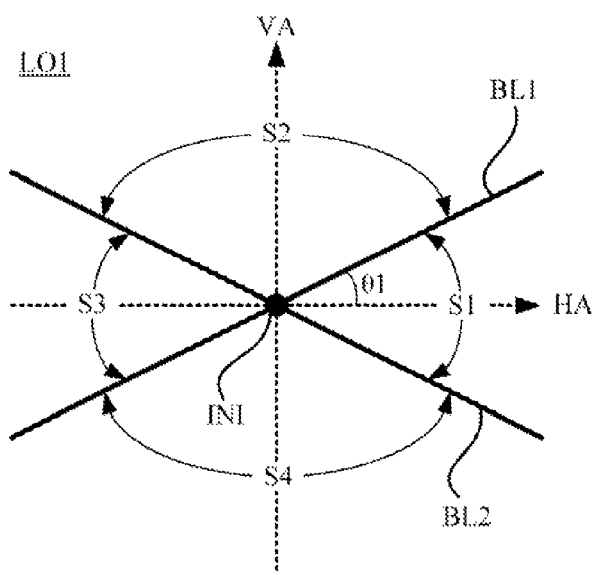
FIG. 4A is a schematic diagram illustrating a border layout according to an embodiment of the disclosure.

Reference is also made to FIG. 4A, which is a schematic diagram illustrating a border layout LO1 according to an embodiment of the disclosure. In the embodiment, when the initial touchdown point INI is located in the first portion POR1 (i.e., the swipe gesture GST1, GST2 or GST3), the swipe gesture GST1/GST2/GST3 is recognized to be the vertical swipe or the horizontal swipe according to a directional vector of the swipe gesture GST1/GST2/GST3 in reference to the border layout LO1 shown in FIG. 4A (the first border layout in this embodiment).

The border layout LO1 is utilized in this embodiment as a standard to discriminate the swipe gesture GST1, GST2 or GST3 into the vertical swipe or the horizontal swipe.

The border layout LO1 includes a pair of border lines BL1 and BL2. The pair of border lines BL1 and BL2, a vertical axis VA and a horizontal axis HA are intersected at a center point and located on a plane of the touch interface 122a. The initial touchdown point INI of the swipe gesture GST1/GST2/GST3 is placed at this center point during the swipe recognition. In other words, the border lines BL1 and BL2, the vertical axis VA and the horizontal axis HA are intersected at the initial touchdown point INI during the swipe recognition, i.e., step S208.

As shown in FIG. 4A, the border lines BL1 and BL2 are mirrored to each other relative to the vertical axis VA and inclined to the horizontal axis HA at a first angle θ1.

In this embodiment, the border line BL1 inclined to the horizontal axis HA at +30°, and the border line BL2 inclined to the horizontal axis HA at −30°. The border lines BL1 and BL2 separate the plane into four sectors S1, S2, S3 and S4. From the initial touchdown point INI, the sector S1 covers a fan-shaped sector of 60° toward the right side; the sector S2 covers a fan-shaped sector of 120° toward the top side; the sector S3 covers a fan-shaped sector of 60° toward the left side; and, sector S4 covers a fan-shaped sector of 120° toward the bottom side. If the directional vector of the swipe gesture falls in the sectors S1 and S3, the swipe gesture will be recognized as the horizontal swipe, If the directional vector of the swipe gesture falls in the sectors S2 and S4, the swipe gesture will be recognized as the vertical swipe.

Figure 5A:
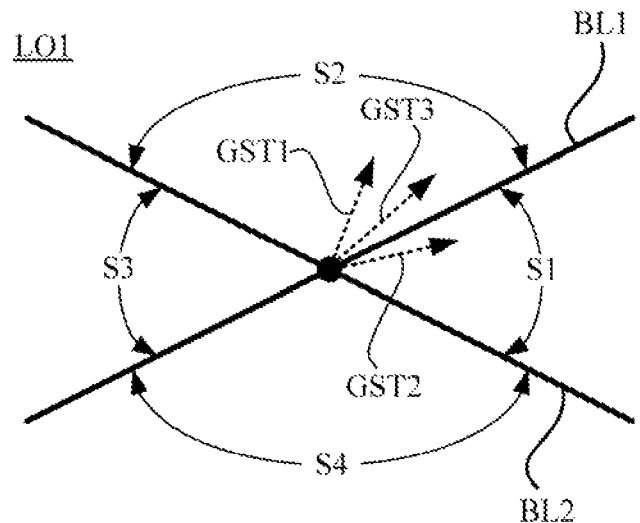
FIG. 5A is a demonstrational example about recognizing the swipe gestures in reference to the border layout shown in FIG. 4A.

Reference is also made to FIG. 5A, which is a demonstrational example about recognizing the swipe gestures GST1~GST3 in reference to the border layout LO1 shown in FIG. 4A. As shown in FIG. 5A, the directional vector of the swipe gesture GST1 is mainly toward the top edge, and the swipe gesture GST1 is recognized as the vertical swipe (specifically, the top swipe). The directional vector of the swipe gesture GST2 is mainly toward the right edge, and the swipe gesture GST2 is recognized as the horizontal swipe (specifically, the right swipe). The directional vector of the swipe gesture GST3 is toward the up-right corner (ambiguously between rightward and upward), and the swipe gesture GST3 is recognized as the vertical swipe (specifically, the up swipe) in this case.

According to the border layout LO1 shown in FIG. 4A (the first border layout in this embodiment), there is a larger window (the sectors S2 and S4) to recognize the swipe gesture as the vertical swipe, and a smaller window (the sectors S1 and S3) to recognize the swipe gesture as the horizontal swipe. Therefore, in response to the initial touchdown point INI is located in the first portion POR1, the swipe gesture is recognized to be the vertical swipe at a relatively higher sensitivity and to be the horizontal swipe at a relatively lower sensitivity in reference to the border layout LO1.

In response to the initial touchdown point INI is located in the second portion POR2 (i.e., the swipe gesture GST4, GST5 or GST6), the gesture detection method 200 executes step S210 to recognize whether the swipe gesture is the vertical swipe or the horizontal swipe according to the directional vector of the swipe gesture in reference to the second border layout, which is different from the first border layout.

Figure 4B:
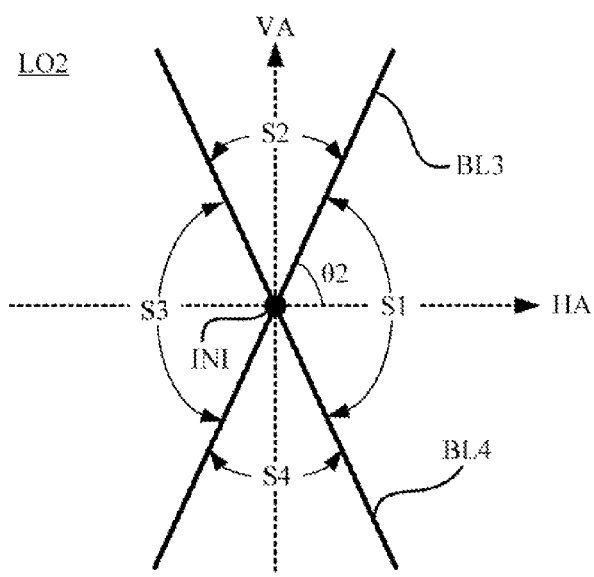
FIG. 4B is a schematic diagram illustrating another border about according to an embodiment of the disclosure.

Reference is also made to FIG. 4B, which is a schematic diagram illustrating another border layout LO2 according to an embodiment of the disclosure. In the embodiment, when the initial touchdown point INI is located in the second portion POR2 (i.e., the swipe gesture GST4, GST5 or GST6), the swipe gesture GST4/GST5/GST6 is recognized to be the vertical swipe or the horizontal swipe according to a directional vector of the swipe gesture GST4/GST5/GST6 in reference to the border layout LO2 shown in FIG. 4B (the second border layout in this embodiment).

The border layout LO2 is utilized in this embodiment as a standard to discriminate the swipe gesture GST4, GST5 or GST6 into the vertical swipe or the horizontal swipe.

The border layout LO2 includes a pair of border lines BL3 and BL4. The pair of border lines BL3 and BL4, a vertical axis VA and a horizontal axis HA are intersected at a center point and located on a plane of the touch interface 122a. The initial touchdown point INI of the swipe gesture GST4/GST5/GST6 is placed at this center point during the swipe recognition. In other words, the border lines BL3 and BL4, the vertical axis VA and the horizontal axis HA are intersected at the initial touchdown point INI during the swipe recognition, i.e., step S210.

As shown in FIG. 4A, the border lines BL3 and BL4 are mirrored to each other relative to the vertical axis VA and inclined to the horizontal axis HA at a second angle θ2.

In this embodiment, the border line BL3 inclined to the horizontal axis HA at +75°, and the border line BL4 inclined to the horizontal axis HA at −75°. The border lines BL3 and BL4 separate the plane in FIG. 46 into four sectors S1, S2, S3 and S4. From the initial touchdown point INI, the sector S1 covers a fan-shaped sector of 150° toward the right side, the sector S2 covers a fan-shaped sector of 30° toward the top side; the sector S3 covers a fan-shaped sector of 150° toward the left side; and, sector S4 covers a fan-shaped sector of 30° toward the bottom side. If the directional vector of the swipe gesture falls in the sectors S1 and S3, the swipe gesture will be recognized as the horizontal swipe. If the directional vector of the swipe gesture falls in the sectors S2 and S4, the swipe gesture will be recognized as the vertical swipe.

Figure 5B:
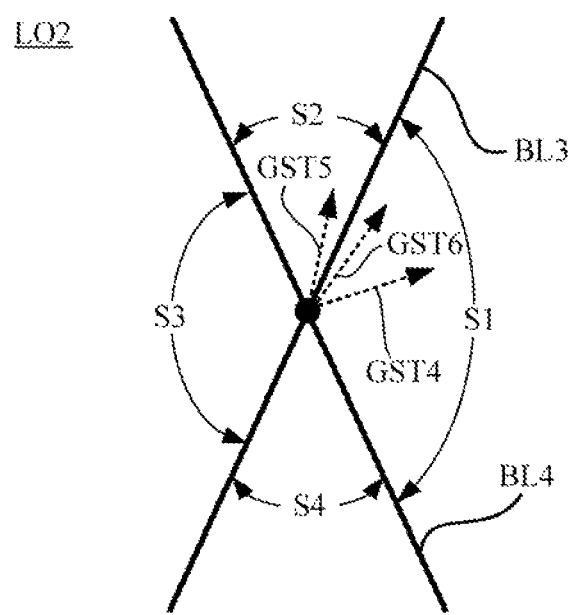
FIG. 5B is a demonstrational example about recognizing the swipe gestures in reference to the border layout shown in FIG. 4B.

Reference is also made to FIG. 5B, which is a demonstrational example about recognizing the swipe gestures GST4~GST6 in reference to the border layout LO2 shown in FIG. 4B. As shown in FIG. 5B, the directional vector of the swipe gesture GST4 is mainly toward the right edge, and the swipe gesture GST4 is recognized as the horizontal swipe (specifically, the right swipe). The directional vector of the swipe gesture GST5 is mainly toward the top edge, and the swipe gesture GST5 is recognized as the vertical swipe (specifically, the top swipe). The directional vector of the swipe gesture GST6 is toward the up-right corner (ambiguously between rightward and upward), and the swipe gesture GST6 is recognized as the horizontal swipe (specifically, the right swipe) in this case.

Based on aforesaid embodiment, the swipe gestures GST3 and GST6 have similar directional vector (toward the up-right corner) from their own initial touchdown points, but the swipe gestures GST3 and GST6 are recognized to the vertical swipe and the horizontal swipe respectively by the gesture detection method 200. Therefore, the gesture detection method 200 is able to treat the swipe gestures from different initial touchdown points with different standards.

According to the border layout LO2 shown in FIG. 4B (the second border layout in this embodiment), there is a larger window (the sectors S1 and S3) to recognize the swipe gesture as the horizontal swipe, and a smaller window (the sectors S2 and S4) to recognize the swipe gesture as the vertical swipe. Therefore, in response to the initial touchdown point INI is located in the second portion POR2, the swipe gesture is recognized to be the horizontal swipe at a relatively higher sensitivity and to be the vertical swipe at a relatively lower sensitivity in reference to the border layout LO2.

In aforesaid embodiment, the first border layout corresponding to the initial touchdown point INI in the first portion POR1 is the border layout LO1 shown in FIG. 4A, which has an absolutely higher sensitivity in the vertical swipe; and, the second border layout corresponding to the initial touchdown point INI in the second portion POR2 is the border layout LO2 shown in FIG. 4B, which has an absolutely higher sensitivity in the horizontal swipe, but this disclosure is not limited thereto.

Figure 4C:
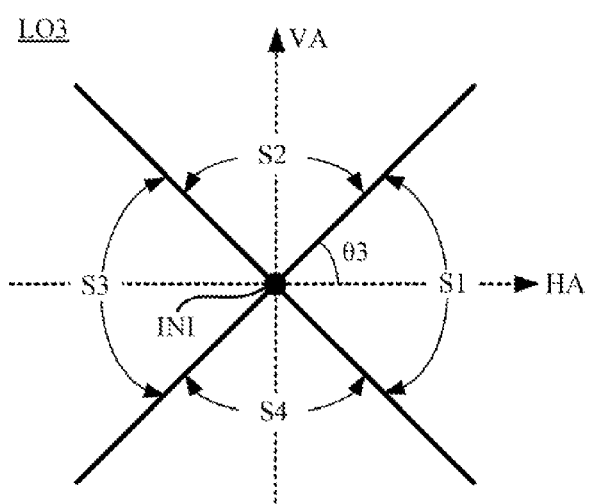
FIG. 4C is a schematic diagram illustrating another border layout according to an embodiment of the disclosure.

Reference is also made to FIG. 4C, which is a schematic diagram illustrating another border layout LO3 according to an embodiment of the disclosure. The border layout LO3 has a balanced sensitivity in both of the horizontal swipe and the vertical swipe.

In another embodiment, the first border layout corresponding to the initial touchdown point INI in the first portion POR1 is the border layout LO1 shown in FIG. 4A, and the second border layout corresponding to the initial touchdown point INI in the second portion POR2 is the border layout LO3 shown in FIG. 4C. In this case, the swipe gesture with the initial touchdown point in the first portion POR1 is recognized to be the vertical swipe at an absolutely higher sensitivity, and the swipe gesture with the initial touchdown point in the second portion POR2 is still recognized to be the horizontal swipe at a "relatively" higher sensitivity (compared to the swipe gesture with the initial touchdown point in the first portion POR1).

In another embodiment, the first border layout corresponding to the initial touchdown point INI in the first portion POR1 is the border layout LO3 shown in FIG. 4C, and the second border layout corresponding to the initial touchdown point INI in the second portion POR2 is the border layout LO2 shown in FIG. 4B. In this case, the swipe gesture with the initial touchdown point in the first portion POR1 is still recognized to be the vertical swipe at a "relatively" higher sensitivity (compared to the swipe gesture with the initial touchdown point in the second portion POR2), and the swipe gesture with the initial touchdown point in the second portion POR2 is recognized to be the horizontal swipe at an absolutely higher sensitivity.

In aforesaid embodiments, the touch interface 122a includes the first portion POR1 and the second portion POR2, and the first portion POR1 includes two elongated strip areas POR1a and POR1b. However, the disclosure is not limited to the layout of the touch interface 122a shown in FIG. 3A and FIG. 3B.

Figure 6:
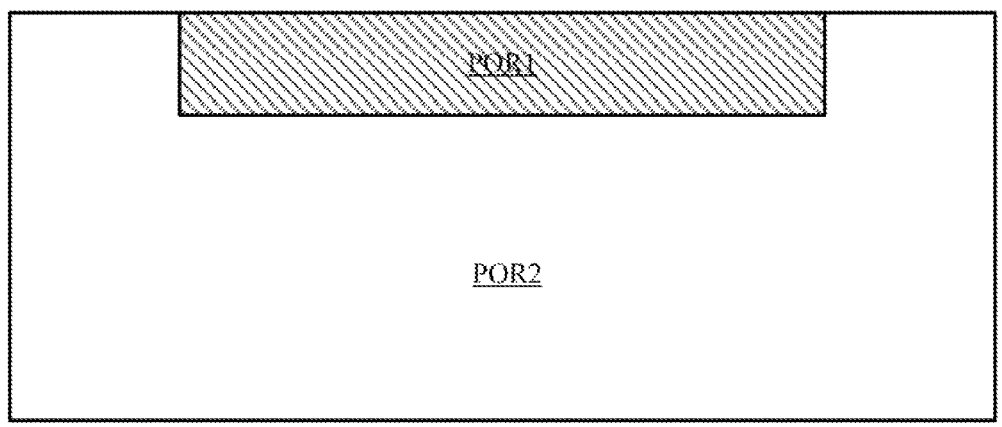
FIG. 6 to FIG. 9 are schematic diagrams illustrating different touch interfaces provided by the touch panel according to some other embodiments of this disclosure.

Reference is also made to FIG. 6, which is a schematic diagram illustrating another touch interface 122b provided by the touch panel according to another embodiment of this disclosure. Compared to the embodiment shown in FIG. 3A and FIG. 3B, the first portion POR1 in this embodiment shown in FIG. 6 includes one elongated strip area located beside a middle part of the top edge of the touch interface 122b. The second portion POR2 in this embodiment is a "U"-shaped area. Similarly, the first portion in another embodiment (not shown in figures) includes one elongated strip area located beside a middle part of the bottom edge of the touch interface.

Based on the gesture detection method 200 disclosed in previous embodiments, the swipe gesture is recognized to be the vertical swipe at a relatively higher sensitivity in response to the initial touchdown point is located in the first portion POR1 shown in FIG. 6, and the swipe gesture is recognized to be the horizontal swipe at a relatively higher sensitivity in response to the initial touchdown point is located in the second portion POR2 shown in FIG. 6.

Figure 7:
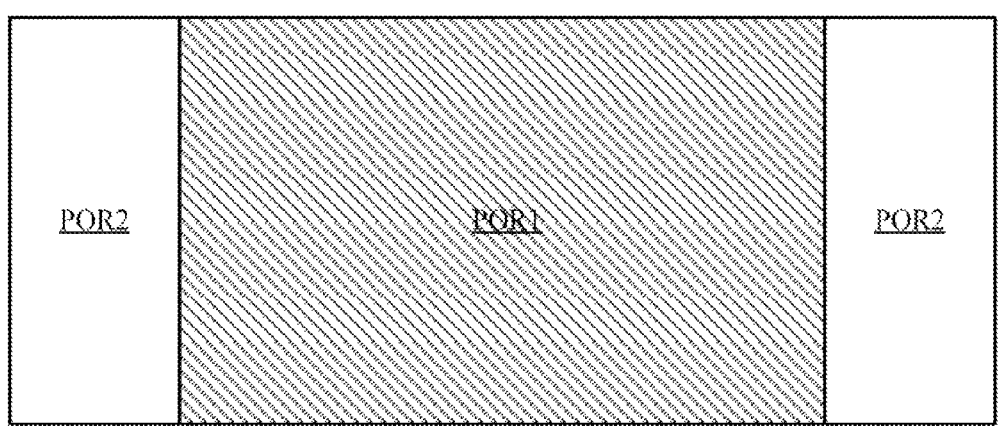

Reference is also made to FIG. 7, which is a schematic diagram illustrating another touch interface 122c provided by the touch panel according to another embodiment of this disclosure. Compared to the embodiment shown in FIG. 3A and FIG. 3B, the first portion POR1 in this embodiment shown in FIG. 6 includes an area located at a middle part of the touch interface 122b. The second portion POR2 in this embodiment includes two elongated strip areas located beside the second pair of edges (i.e., the left edge and the right edge) of the touch interface 122c.

Based on the gesture detection method 200 disclosed in previous embodiments, the swipe gesture is recognized to be the vertical swipe at a relatively higher sensitivity in response to the initial touchdown point is located in the first portion POR1 shown in FIG. 7, and the swipe gesture is recognized to be the horizontal swipe at a relatively higher sensitivity in response to the initial touchdown point is located in the second portion POR2 shown in FIG. 7.

Figure 8:
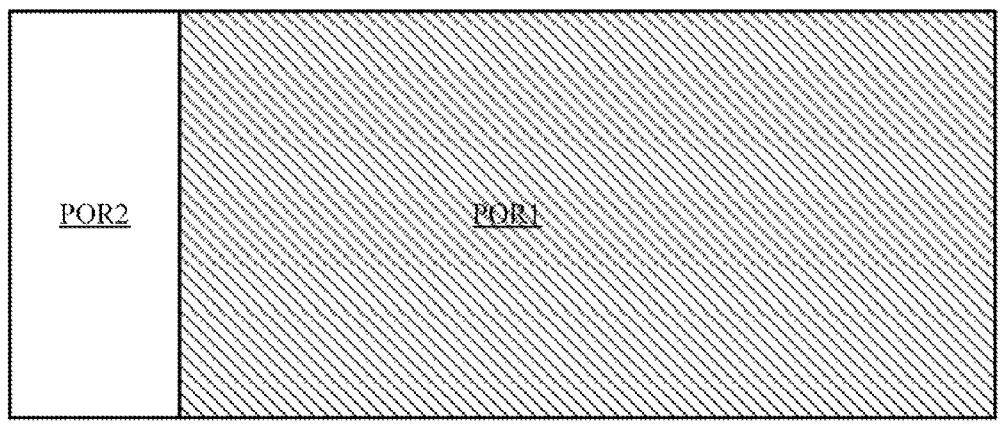

Reference is also made to FIG. 8, which is a schematic diagram illustrating another touch interface 122d provided by the touch panel according to another embodiment of this disclosure. Compared to the embodiment shown in FIG. 7, the second portion POR2 includes one elongated strip area located beside the left edge of the touch interface 122d. Similarly, the second portion in another embodiment (not shown in figures) includes one elongated strip area located beside the right edge of the touch interface.

In previous embodiments in FIG. 3A, FIG. 3B, FIG. 6, FIG. 7 and FIG. 8, the touch interface includes two portions, which adopt two different border layouts for discriminating between the vertical swipe and the horizontal swipe. However, the disclosure is not limited thereto. In some other embodiments, the touch interface may include more than two portions. Each of the portions adopts an individual border layout for discriminating between the vertical swipe and the horizontal swipe.

Figure 9:
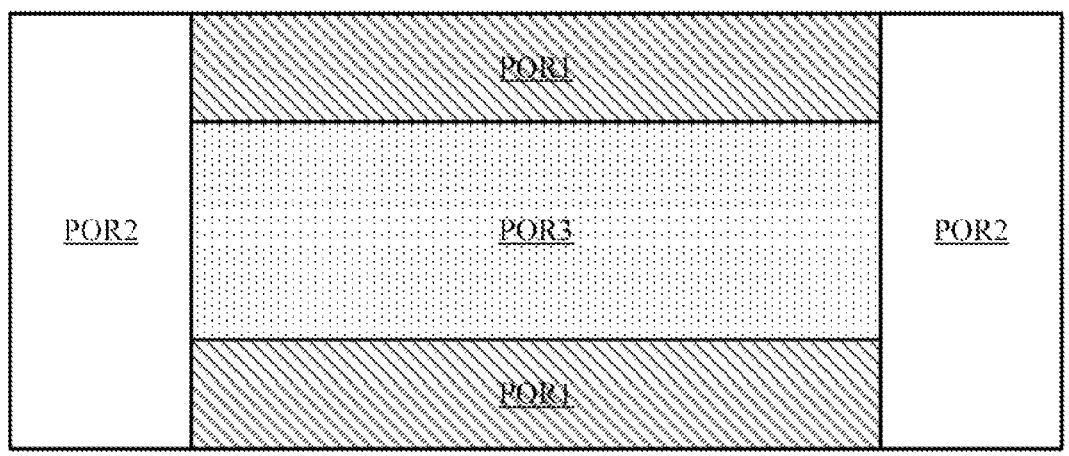

Reference is further made to FIG. 9, which is a schematic diagram illustrating another touch interface 122e provided by the touch panel according to another embodiment of this disclosure.

Compared to the embodiment shown in FIG. 3A and FIG. 3B, the touch interface 122e in FIG. 9 includes a first portion POR1, a second portion POR2 and a third portion POR3. The first portion POR1 in this embodiment shown in FIG. 9 includes two elongated strip areas located beside a middle part of the top/bottom edges of the touch interface 122e. The second portion POR2 in this embodiment includes two elongated strip areas located beside the left/right edges of the touch interface 122e. The third portion POR3 covers the center part of the touch interface 122e.

In response to the initial touchdown point is located in the first portion POR1 in FIG. 9, the swipe gesture is recognized to be the vertical swipe or the horizontal swipe according to a directional vector of the swipe gesture in reference to the first border layout (referring to the border layout LO1 shown in FIG. 4A), such that the swipe gesture is recognized to be the vertical swipe at a relatively higher sensitivity and to be the horizontal swipe at a relatively lower sensitivity.

In response to the initial touchdown point is located in the second portion POR2 in FIG. 9, the swipe gesture is recognized to be the vertical swipe or the horizontal swipe according to a directional vector of the swipe gesture in reference to the second border layout (referring to the border layout LO2 shown in FIG. 4B), such that the swipe gesture is recognized to be the vertical swipe at a relatively lower sensitivity and to be the horizontal swipe at a relatively higher sensitivity.

In response to the initial touchdown point is located in the third portion POR3 in FIG. 9, the swipe gesture is recognized to be the vertical swipe or the horizontal swipe according to a directional vector of the swipe gesture in reference to a balanced border layout (referring to the border layout LO3 shown in FIG. 4C) between the first and the second border layouts.

In some embodiment, the gesture detection method 200 is realized by instructions of one or more programs executed by the processor of the wearable electronic apparatus 100. Aforesaid one or more programs can be stored in a non-transitory computer readable storage medium according to an embodiment of the disclosure.

Based on aforesaid embodiments, this disclosure provides a wearable electronic apparatus, which is capable of recognizing whether the swipe gesture is the vertical swipe or the horizontal swipe in reference to different border layouts. The different border layouts are selected in response to an initial touchdown point of the swipe gesture. Therefore, the swipe gestures with different initial touchdown points will be recognized under different border layouts.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. A wearable electronic apparatus, comprising:
a touch panel, configured for providing a touch interface and detecting a swipe gesture across the touch interface, the touch interface having a first portion and a second portion;
a processor, operatively coupled to the touch panel, the processor being adapted to:
assign a first border layout and a second border layout for discriminating between a vertical swipe and a horizontal swipe, the first border layout being different from the second border layout;
determine whether an initial touchdown point of the swipe gesture is located in the first portion or the second portion of the touch interface;
in response to the initial touchdown point being located in the first portion, utilize the first border layout and place the initial touchdown point at the center of the first border layout, and determine whether the swipe gesture is the vertical swipe or the horizontal swipe according to a directional vector of the swipe gesture in the first border layout; and
in response to the initial touchdown point being located in the second portion, utilize the second border layout and place the initial touchdown point at the center of the second border layout, and determine whether the swipe gesture is the vertical swipe or the horizontal swipe according to the directional vector of the swipe gesture the second border layout;
wherein the touch interface is shaped as a rectangle having a first pair of edges and a second pair of edges, the first pair of edges is longer than the second pair of edges, the first portion covers at least area adjacent to the first pair of edges, the second portion covers at least another area adjacent to the second pair of edges and corners of the touch interface;
wherein the first border layout comprises a first pair of border lines, the first pair of border lines, a vertical axis and a horizontal axis are intersected at the initial touchdown point and located on a plane of the touch interface, the first pair of border lines are mirrored to each other relative to the vertical axis and inclined to the horizontal axis at a first angle;
wherein the second border layout comprises a second pair of border lines, the second pair of border lines, the vertical axis and the horizontal axis are intersected at the initial touchdown point and located on the plane of the touch interface, the second pair of border lines are mirrored to each other relative to the vertical axis and inclined to the horizontal axis at a second angle different from the first angle.

2. The wearable electronic apparatus of claim 1, wherein a diagonal length of the touch panel is less than or equal to three inches.

3. The wearable electronic apparatus of claim 1, wherein, in response to the initial touchdown point is located in the first portion, a sensitivity of recognizing the swipe gesture to be the vertical swipe is higher than an another sensitivity of recognizing the swipe gesture to be the horizontal swipe.

4. The wearable electronic apparatus of claim 1, wherein, in response to the initial touchdown point is located in the second portion, a sensitivity of recognizing the swipe gesture to be the vertical swipe is lower than an another sensitivity of recognizing the swipe gesture to be the horizontal swipe.

5. The wearable electronic apparatus of claim 1, wherein the first portion comprises two elongated strip areas located beside a middle part of the first pair of edges.

6. The wearable electronic apparatus of claim 1, wherein the second portion comprises an "H"-shaped area located beside the second pair of edges and at a center part of the touch interface.

7. The wearable electronic apparatus of claim 1, wherein the wearable electronic apparatus is a smart watch or a smart wristband.

8. A non-transitory computer readable storage medium storing one or more programs, the one or more programs comprising instructions, which when executed by a wearable electronic device with a touch interface, causes the wearable electronic device to perform a method, wherein the method comprises:
- assigning a first border layout and a second border layout for discriminating between a vertical swipe and a horizontal swipe, the first border layout being different from the second border layout;
- detecting a swipe gesture across the touch interface, the touch interface having a first portion and a second portion;
- determining whether an initial touchdown point of the swipe gesture is located in the first portion or the second portion of the touch interface;
- in response to the initial touchdown point being located in the first portion, utilizing the first border layout and place the initial touchdown point at the center of the first border layout, and determining whether the swipe gesture is the vertical swipe or the horizontal swipe according to a directional vector of the swipe gesture in the first border layout; and
- in response to the initial touchdown point being located in the second portion, utilizing the second border layout and place the initial touchdown point at the center of the second border layout, and determining whether the swipe gesture is the vertical swipe or the horizontal swipe according to the directional vector of the swipe gesture the second border layout;
- wherein the touch interface is shaped as a rectangle having a first pair of edges and a second pair of edges, the first pair of edges is longer than the second pair of edges, the first portion covers at least an area adjacent to the first pair of edges, the second portion covers at least another area adjacent to the second pair of edges and corners of the touch interface;
- wherein the first border layout comprises a first pair of border lines, the first pair of border lines, a vertical axis and a horizontal axis are intersected at the initial touchdown point and located on a plane of the touch interface, the first pair of border lines are mirrored to each other relative to the vertical axis and inclined to the horizontal axis at a first angle;
- wherein the second border layout comprises a second pair of border lines, the second pair of border lines, the vertical axis and the horizontal axis are intersected at the initial touchdown point and located on the plane of the touch interface, the second pair of border lines are mirrored to each other relative to the vertical axis and inclined to the horizontal axis at a second angle different from the first angle.

9. The non-transitory computer readable storage medium of claim 8, wherein, in response to the initial touchdown point is located in the first portion, a sensitivity of recognizing the swipe gesture to be the vertical swipe is higher than an another sensitivity of recognizing the swipe gesture to be the horizontal swipe.

10. The non-transitory computer readable storage medium of claim 8, wherein, in response to the initial touchdown point is located in the second portion, a sensitivity of recognizing the swipe gesture to be the vertical swipe is lower than an another sensitivity of recognizing the swipe gesture to be the horizontal swipe.

11. The non-transitory computer readable storage medium of claim 8, wherein the first portion comprises two elongated strip areas located beside a middle part of the first pair of edges.

12. The non-transitory computer readable storage medium of claim 8, wherein the second portion comprises an "H"-shaped area located beside the second pair of edges and at a center part of the touch interface.

13. The wearable electronic apparatus of claim 1, wherein:
- each of the first and second border layouts has a plurality of sectors for determining whether the swipe gesture is the vertical swipe or the horizontal swipe, wherein the sectors of the first border layout for determining whether the swipe gesture is the vertical swipe are larger than the sectors of the first border layout for determining whether the swipe gesture is the horizontal swipe, and the sectors of the second border layout for determining whether the swipe gesture is the horizontal swipe are larger than the sectors of the second border layout for determining whether the swipe gesture is the vertical swipe; and
- determining whether the swipe gesture is the vertical swipe or the horizontal swipe is performed by determining whether the swipe gesture is in one of the sectors of the first border layout or the second border layout corresponding to the vertical swipe or the horizontal swipe.

* * * * *